United States Patent Office 3,427,337
Patented Feb. 11, 1969

3,427,337
SUBSTITUTED SILYLALKYL ACRYLATES
Robert E. Miller, Ballwin, and Robert J. McManimie, Glendale, Mo., assignors to Monsanto Company, St. Louis, Mo., a corporation of Delaware
No Drawing. Continuation-in-part of application Ser. No. 423,842, Jan. 6, 1965. This application Apr. 5, 1965, Ser. No. 445,781
U.S. Cl. 260—448.2                10 Claims
Int. Cl. C07f 7/18; C09j 3/00; C03c 25/02

ABSTRACT OF THE DISCLOSURE

Substituted silylacrylates of the formula

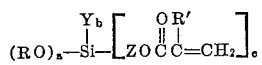

where R is selected from the group consisting of hydrogen and hydrocarbyl and alkyl carbonyl having up to 8 carbon atoms, R' is selected from the group consisting of hydrogen and alkyl having up to 2 carbon atoms, Y is hydrocarbyl, Z is alkylene having from 7 to about 20 carbon atoms, $a$ is an integer from 1 to 3, $b$ is an integer from 0 to 2, $c$ is an integer from 1 to 3 and the sum of $a+b+c$ equals 4. Also described in a process for preparing the above compounds comprising reacting an alkenyl alkanoate with a halosilane, reacting the resulting product with a hydroxy compound, and reacting this product with an acrylic acid or ester.

---

The present application is a continuation-in-part of our copending joint application Ser. No. 423,842, filed Jan. 6, 1965.

This invention relates to substituted silylalkyl acrylates as novel compositions of matter. The invention further relates to a novel process for preparing the compounds subsequently disclosed herein. It should be understood that the terms acrylate and acrylic are used generically to include both the unsubstituted acrylates as well as methacrylates, ethacrylates and the like.

Among those skilled in the art of producing fiber-reinforced plastics, the use of certain silanes to treat glass fibers is well known. Workers have for several years treated bundles of glass fibers with various organo-alkoxysilanes and organo-halosilanes to reduce the tendency of the fibers to bind and seize one another during polymeric molding operations. In recent years, it has been discovered that a use of specific organo-silanes with specific polymer systems results in improved adhesion of the glass fibers to the polymer matrix. For example, 3-aminopropyltriethoxysilane, $NH_2—(CH_2)_3—Si—(OC_2H_5)_3$, in addition to functioning as a size for glass fibers, also improves adhesion of the fibers to certain resin systems such as polyamides and polyepoxides. Other compounds, such as allyl trichlorosilane, $CH_2=CHCH_2SiCl_3$, and 3-methacrylatopropyltrimethoxysilane,

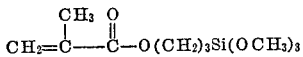

when used to treat glass fibers, improve the adhesion of fibers to polymer matrices such as the polyesters and polyalkyl methacrylates.

More recently as described in copending patent application Ser. No. 423,862, filed Jan. 6, 1965, now Patent No. 3,324,074, it has been discovered that polyalkyl methacrylates can be reinforced with glass fibers and other inorganic materials which have been treated with acrylato lower alkyl substituted silanes. Further research, as described in copending patent application Ser. No. 423,842, filed Jan. 6, 1965, developed other substituted silanes which performed even better as coupling agents between polyalkyl methacrylates and inorganic materials.

It is a principal object of the present invention to provide substituted silyl higher alkyl acrylates as novel compositions of matter. It is a further object of the present invention to provide a novel process for preparing the above compounds. Additional objects, benefits and advantages will become apparent as the detailed description of the invention proceeds.

Compounds according to the present invention are represented by the formula

where R is hydrogen, hydrocarbyl or alkyl carbonyl, R' is hydrogen or alkyl having one or two carbon atoms, Y is hydrocarbyl, Z is an alkylene group having from 7 to about 20 carbon atoms, $a$ is an integer from 1 to 3, $b$ is an integer from 0 to 2, $c$ is an integer from 1 to 3 and the sum of $a+b+c$ equals 4. The R' group is preferably hydrogen or methyl although ethyl can also be used. The RO group of the compound must be a hydrolyzable group which will react with hydroxyl groups. For this reason, the R group is limited to 8 carbon atoms. Preferred are alkyl groups having from 1 to about 6 carbon atoms; acceptable are groups such as hydrogen, alkyl carbonyl and hydrocarbyl radicals other than alkyl groups such as phenyl groups. The Y group of the compound can be any hydrocarbyl group such as alkyl, alkenyl, alkynyl, phenyl, tolyl, benzyl or naphthyl. Preferred are lower alkyl groups such as methyl and ethyl. A hydrocarbyl group is any monovalent hydrocarbon group. The Z group can be any straight or branched alkylene radical having from 7 to about 20 carbon atoms, and preferably is unbranched radical having from about 11 to about 18 carbon atoms. The integers $a$, $b$, and $c$ can vary as described above; preferably values for the three integers are 3, 0 and 1, respectively. Particularly preferred silanes are the trialkoxysilylalkyl methacrylates of the formula

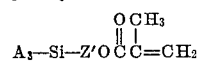

where A is a methoxy or ethoxy group and Z' is a straight chained alkylene group of from about 11 to about 18 carbon atoms.

Examples of compounds conforming to the above generic formula include di-[8-methachrylatooctyl]diethoxysilane
    $[CH_2=C(CH_3)COO(CH_2)_8]_2Si(OC_2H_5)_2$ 8-acrylatooctyl methyldiphenoxysilane,
    $CH_2=CHCOO(CH_2)_8Si(CH_3)(OC_6H_5)_2$ 10-methacrylatodecyl triacetoxysilane
    $CH_2=C(CH_3)COO(CH_2)_{10}Si(OOCCH_3)_3$ 11-acrylatoundecyl ethyldimethoxysilane
    $CH_2=CHCOO(CH_2)_{11}Si(C_2H_5)(OCH_3)_2$ 11-methacrylatoundecyl trimethoxysilane
    $CH_2=C(CH_3)COO(CH_2)_{11}Si(OCH_3)_3$ 11-methacrylatoundecyl vinyl dipropoxysilane
    $CH_2=C(CH_3)COO(CH_2)_{11}Si(C_2H_3)(OC_3H_7)_2$ 11-ethacrylatoundecyl trimethoxysilane
    $CH_2=C(C_2H_5)COO(CH_2)_{11}Si(OCH_3)_3$ di-[12-acrylatododecyl]diphenoxysilane
    $[CH_2=CHCOO(CH_2)_{12}]_2Si(OC_6H_5)_2$ tri-[12-methacrylatododecyl]ethoxysilane
    $[CH_2=C(CH_3)COO(CH_2)_{12}]_3SiOC_2H_5$ 14-ethacrylatotetradecyl tripropionoxysilane
    $CH_2=C(C_2H_5)COO(CH_2)_{14}Si(OOCC_2H_5)_3$ 14-methacrylatohexadecyl tributoxysilane
$$CH_2=C(CH_3)COOCH(C_2H_5)(CH_2)_{13}Si(OC_4H_9)_3$$
14-acrylatotetradecyl triacetoxysilane
$$CH_2=CHCOO(CH_2)_{14}Si(OOCCH_3)_3$$
14-methacrylatotetradecyl methyldimethoxysilane
$$CH_2=C(CH_3)COO(CH_2)_{14}Si(CH_3)(OCH_3)_2$$
15-methacrylatohexadecyl trimethoxysilane
$$CH_2=C(CH_3)COOCH(CH_3)(CH_2)_{14}Si(OCH_3)_3$$
16-acrylatohexadecyl triethoxysilane
$$CH_2=CHCOO(CH_2)_{16}Si(OC_2H_5)_3$$
16-methacrylatohexadecyl triacetoxysilane
$$CH_2=C(CH_3)COO(CH_2)_{16}Si(OOCCH_3)_3$$
17-acrylatooctadecyl tributoxysilane
$$CH_2=CHCOOCH(CH_3)(CH_2)_{16}Si(OC_4H_9)_3$$
18-ethacrylatooctadecyl trihydroxysilane
$$CH_2=C(C_2H_5)COO(CH_2)_{18}Si(OH)_3$$
18-acrylatooctadecyl triacetoxysilane
$$CH_2=CHCOO(CH_2)_{18}Si(OOCCH_3)_3$$
18-methacrylatooctadecyl trimethoxysilane
$$CH_2=C(CH_3)COO(CH_2)_{18}Si(OCH_3)_3$$
18-acrylatooctadecyl methyldihydroxysilane
$$CH_2=CHCOO(CH_2)_{18}Si(CH_3)(OH)_2$$
20-methacrylatoeicosyl trimethoxysilane
$$CH_2=C(CH_3)COO(CH_2)_{20}Si(OCH_3)_3$$
di-[20-acrylatoeicosyl]dipropoxysilane
$$[CH_2=CHCOO(CH_2)_{20}]_2Si(OC_3H_7)_2$$
20-methacrylatoeicosyl dimethylethoxysilane
$$CH_2=C(CH_3)COO(CH_2)_{20}Si(CH_3)_2OC_2H_5$$

It will also be recognized that the above compounds can be named as substituted acrylates, as for example 11-(trimethoxysilyl)undecyl methacrylate, $$CH_2=C(CH_3)COO(CH_2)_{11}Si(OCH_3)_3$$

The silanes of the present invention are prepared by a three stage reaction, the first portion of which comprises reacting an alkenyl alkanoate with a halogenated silane. To accelerate the reaction, a catalyst of the platinum metals series or of the palladium metals series is often used. Preferred catalysts include platinum or palladium on carbon or salts or acids of the metals such as chloroplatinic acid, $H_2PtCl_6 \cdot 2H_2O$, and ammonium chloropalladate, $(NH_4)_2PdCl_6$.

The alkenyl alkanoate reactants used in the above reaction must have an alkenyl group of at least seven carbon atoms to provide the novel compounds of this invention. The olefinic bond can be present anywhere within the alkenyl radical. Preferably it is located so that the halosilylalkyl alkanoate product has a longer chain of carbon atoms separating the silicon atom from the carboxyl group than the length of carbon atoms in the alkyl side chain which will be formed if the olefinic bond is located anywhere other than the terminal position. Most preferably, the olefinic bond is located in the terminal position of an alkenyl group having from about 11 to about 18 carbon atoms. Examples of suitable alkenyl alkanoats include 6-heptenyl acetate, 5-heptenyl acetate, 7-octenyl propionate, 7 decenyl propionate, 9-decenyl acetate, 9-undecenyl acetate, 10-undecenyl acetate, 10-undecenyl isobutyrate, 8-dodecenyl acetate, 11-dodecenyl propionate, 13 - tetradecentyl acetate, 14 - hexadecenyl acetate, 15-hexadecenyl acetate, 17-octadecenyl acetate, 17-octadecenyl propionate and 19-eicosenyl acetate.

The silane reactant must contain at least one halogen atom and at least one hydrogen atom, both of which must be attached directly to the silicon atom. The remaining two valence bonds of the silicon can be satisfied by additional halogen or hydrogen radicals and/or by hydrocarbyl radicals. The presence of one or more hydrocarbyl radicals serves to change the rate of reaction between the halosilane and alkenyl alkanoate, to change the yield of the product, and to modify the extent and strength of chemical bonds formed between the coupler product and mineral reinforcing agent. The hydrocarbyl radical itself is not involved in the silane-alkanoate reaction and hence can be any unreactive substituent. Since alkyl halosilanes are easily prepared, preferred hydrocarbyl substituents are alkyl radicals. Examples of silanes suitable for the preparation of the acrylatoalkyl silanes of this invention include: trichlorosilane, triiodosilane, chlorobromo-ethylsilane, dichlorosilane, monofluorosilane, methyldichlrosilane, phenyldichlorosilane, and ethenyldibromosilane. Preferred silanes are the trichloro and tribromosilanes.

In preferred aspects, the silane is added dropwise to the alkanoate-catalyst mixture. The entire reaction mixture is maintained at 100 or 150° C. for from several minutes to an hour or more. The reaction proceeds as follows:

$$\text{Alkenyl } O\overset{O}{\overset{\|}{C}}R'' + X_aSi-H_c \xrightarrow{\text{Pt or Pd cat}} X_a-\overset{Y_b}{\underset{|}{Si}}[-ZO\overset{O}{\overset{\|}{C}}R'']_c$$

where Z is an alkylene group of from 7 to about 20 carbon atoms, R″ is an alkyl group, X is a halogen, Y is a hydrocarbyl group, $a$ is an integer from 1 to 3, $b$ is an integer from 0 to 2, $c$ is an integer from 1 to 3, and the sum of $a+b+c$ equals 4. Any unreacted silane can be removed by vacuum distillation. The product, a halosilylalkyl alkanoate, is further reacted with a substance to remove the halogen atoms and substitute in place thereof an hydroxy, hydrocarbyloxy, or alkyl carboxylate radical. Reactants capable of performing as described above include water, alcohols such as methanol, ethanol, isobutanol, etc., phenol and substituted phenols and organic acids and esters such as acetic and propionic acids, ethyl acetate and methyl isobutyrate. Particularly preferred are methanol and ethanol. It should be recognized that there are several additional reactants which can be used to place a satisfactory hydrolyzable group on the silicon atom. As an example, methyl 3-hydroxypropionate, $CH_3OOC(CH_2)_3OH$, will react with a halosilylalkyl alkanoate to yield a methoxycarbonylpropoxysilylalkanol, $$[CH_3OOC(CH_2)_3O]_a\overset{Y_b}{\underset{|}{Si}}-[ZOH]_c$$

where the hydrocarbyl group, i.e. propyl group, has an additional substituent attached thereto, i.e. methoxycarbonyl group. The terms hydrocarbyl and alkyl carboxylate are therefore intended to cover both the unsubstituted groups as well as those substituted groups where the substituents do not interfere with the Si-O-C hydrolysis. The reaction proceeds according to the equation $$X_a-\overset{Y_b}{\underset{|}{Si}}-[ZO\overset{O}{\overset{\|}{C}}R'']_c + ROH(RO)_a-\overset{Y_b}{\underset{|}{Si}}-[Z-OH]_c + HX + R\overset{O}{\overset{\|}{C}}OR''$$

where R is a hydrogen, hydrocarbyl or alkyl carbonyl group and the other symbols are the same as set forth above. The reaction mixture can be refluxed gently to speed the reaction of the halosilylalkyl alkanoate with the compound described above. Following completion of the reaction, the mixture is distilled under vacuum to remove by-products and unused reactants. The residue is subsequently reacted with an acrylic acid or ester to yield the desired substituted silylalkyl acrylate. Suitable acrylic compounds include acrylic acid, methylacrylic acid, ethacrylic acid, ethyl acrylate, methyl methacrylate, propyl ethacrylate, methyl ethacrylate and phenyl acrylate. The reaction proceeds according to the equation $$(RO)_a-\overset{Y_b}{\underset{|}{Si}}-[Z-OH]_c + HO\overset{O}{\overset{\|}{C}}-\overset{R'}{\underset{|}{C}}=CH_2(RO)_a-\overset{Y_b}{\underset{|}{Si}}-\left[ZO\overset{O}{\overset{\|}{C}}\overset{R'}{\diagup}=CH_2\right]_c + HOH$$

where R' is either hydrogen or a lower alkyl group having one or two carbon atoms and the other symbols represent functional groups as set forth above.

The reaction product of the three-stage synthesis is a gelatinous mass which contains an appreciable quantity of siloxane resin. The monomeric substituted silylalkyl acrylate can be extracted from the resin with an organic solvent such as benzene, toluene, xylene, methanol, isopropanol, isooctane, methyl cyclohexane, etc. using conventional extraction techniques.

The silanes of the present invention are particularly useful as coupling agents in preparing reinforced polymeric compositions. Copending U.S. patent applications Ser. Nos. 423,842 and 423,868, filed Jan. 6, 1965, describe techniques for reinforcing polyalkyl methacrylates with the compounds of this invention. Analogous techniques can be devised to reinforce other polymer systems such as polystyrenes and polyesters as well as ABS and SAN polymers using the compounds disclosed and claimed herein. In addition, the novel silanes can be used to modify the surface of a normally hydrophilic substance, rendering it water-repellent. Further uses include the use of the compounds as a monomer to produce either polysiloxane resins with appended acrylate groups or polyalkly acrylates with appended alkoxysilyl groups.

The present invention will be more fully understood when read in conjunction with the detailed descriptions set forth in the examples below, which describe the novel silanes, their preparation and one of their preferred uses.

Example 1

To 187 grams of undecenyl acetate, $CH_2=CH(CH_2)_9 OOCCH_3$, 1.5 grams of chloroplatinic acid in isopropanol is added. The mixture is heated to 100° C., at which time the dropwise addition of 126 grams of trichlorosilane is started. The rate of silane addition is regulated to maintain an exothermic reaction of about 140 to 150° C. As the exotherm diminishes, the silane is added more rapidly and the entire contents of the reaction vessel allowed to reflux for about an hour. After refluxing, excess silane is removed by vacuum distillation. To the trichlorosilylundecyl acetate residue is added 250 ml. of methanol and the mixture heated to reflux temperature for about three hours. Following distillation at reduced pressure to remove HCl and methyl acetate, the residue is further reacted with 80 grams of methacrylic acid. After volatiles are removed, residue remains. The residue is extracted with diethyl ether to separate the desired product from polymeric by-product. The extractant is dried and identified as 11-(trimethoxysilyl)undecyl methacrylate. Calculated for $C_{18}H_{36}O_5Si$: C, 60.0%; H, 10.0%; found C, 60.7%; H, 10.0%. Calculated saponification equivalent is 360.5; found 357.0. Refractive index is 1.4518; boiling point is greater than 160° C. at 5 mm. Hg. Infrared analysis confirms the structure assigned to the extractant.

Example 2

To 250 grams of 17-octadecenyl propionate, $CH_2=CH(CH_2)_{16}OOCC_2H_5$, 1.5 grams of chloroplatinic acid in isopropanol is added. Trichlorosilane is added dropwise with stirring, causing an exotherm. The rate of silane addition is regulated to maintain a temperature of about 150° C. As the exotherm diminishes, the silane is added more rapidly. After all the silane is added, the reaction mixture is refluxed for about one hour. Excess silane is then removed by vacuum distillation. To the trichlorosilyloctadecyl propionate is added 400 ml. of acetic acid and the resultant mixture heated to reflux temperature for about three hours. Following distillation at reduced pressure to remove HCl and propionic and acetic acids, the residue is further reacted with 85 grams of acrylic acid. After volatiles are removed, a viscous residue remains. The residue is extracted with toluene to separate the desired product from the polymeric byproduct. The extractant is dried and identified as 18-(triacetosilyl)octadecyl acrylate. Infrared analysis confirms the structure assigned to the extractant.

Example 3

To 2000 grams of wollastonite having a particle size distribution from 74 to 11μ, 5 grams of 11-(trimethoxysilyl)-undecyl methacrylate dissolved in 1200 ml. of dioxane is added with stirring. The mixture is further subjected to agitation in a ball mill for 15 minutes, after which time the dioxane is removed by evaporation. The treated wollastonite is finally dried in an oven for one hour at 210° C.

A reactor is charged with 335.0 grams of methyl methacrylate, 6.8 grams of benzoyl peroxide and 914 grams of the treated wollastonite. A simple mold of two polished plates separated by a rubber gasket is preheated to 65° C., after which time the reaction mixture is poured into the mold. The 65° C. mold temperature is maintained for about 2 hours, causing a polymerization exotherm and a rise in the mold temperature to about 75° C. The temperature is maintained at 65° C. for about 18 more hours. The mold is cooled and opened, yielding a smooth white sheet of reinforced polymethyl methacrylate containing 72.8% by weight (0.47 volume fraction) wollastonite. Results are reported below. For comparative purposes, compositions A, B and C are also reported. Composition A is an unfilled, unreinforced polymethyl methacrylate composition identical to the composition of Example 2 except that no silane is used and the inorganic loading is 65% by weight, the maximum loading possible when no silane coupler is used. Composition C is identical to Composition B except that a silane coupler, 3-(trimethoxysilyl)propyl methacrylate, is used.

|  | Flexural Strength, p.s.i. | Flexural Modulus, p.s.i. | Notched Izod Impact Strength (ft.lb./in.) |
| --- | --- | --- | --- |
| Composition A | 13,500 | 0.41×10⁶ | .31(.10) |
| Composition B | 9,100 | 2.1 | |
| Composition C | 15,600 | 2.6 | .32(.10) |
| Composition of Ex. 3 | 17,100 | 2.5 | .33(.12) |

Comparison of Compositions A and B indicates that mere filling of a methacrylate polymer provides a weak, brittle composition having essentially no impact strength. Composition C shows the dramatic improvement in mechanical properties achieved by coupling the polymer to the inorganic substrate. Example 3 shows the further improvement achieved by using one of the compounds of the present invention. It should also be noted that the composition of Example 3 contains 73% inorganic material, thereby making it more economically attractive than Composition C which contains 65% by weight inorganic.

Example 4

A reinforced polymethyl methacrylate composition containing 75% by weight wollastonite is prepared according to the procedure described in Example 3, using instead of the undecyl compound, 18-triacetosilyloctadecyl acrylate. The silyloctadecyl acrylate coupler is used to treat the wollastonite at the rate of 5 grams per 1000 grams of inorganic. The resultant composition has mechanical properties comparable to the composition of Example 3.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, alkoxy groups and more specifically methoxy groups have been exemplified as preferred substituents for attachment to the silicon atom of the instant compounds. Other hydrocarbyloxy groups such as phenoxy and tolyloxy groups are also acceptable. Alkyl carboxylate groups have also been exemplified as acceptable substituents for attachment to the silicon atom. Aryl carboxylate groups, such as a benzoxy group, are also hydrolyzable and will function acceptably when attached to the silicon atom of the instant compounds. It should further be pointed out that the claims are in no way limited by theoretical explanations in the present disclosure. As an example, the second stage of the compound synthesis may not inevitably yield a substituted silylalkanol. Depending upon the ROH reactant and the reactivity of the $$-O\overset{O}{\underset{\|}{C}}R''$$

group, the product may have the formula $$(RO)_a-\underset{\underset{Y_b}{|}}{Si}-[ZO\overset{O}{\underset{\|}{C}}R]_c \quad \text{or} \quad (RO)_a-\underset{\underset{Y_b}{|}}{Si}[ZO\overset{O}{\underset{\|}{C}}R'']_c$$

Accordingly, these and other modifications are contemplated which can be made without departing from the spirit of the described invention.

What is claimed is:

1. A process for preparing compounds of the formula $$(RO)_a-\underset{\underset{Y_b}{|}}{Si}-[ZO\overset{O}{\underset{\|}{C}}\overset{R'}{\underset{}{C}}=CH_2]_c$$

where R is selected from the group consisting of hydrocarbyl and alkyl carbonyl having up to 8 carbon atoms, R' is selected from the group consisting of hydrogen and alkyl having up to 2 carbon atoms, Y is hydrocarbyl, Z is alkylene having from 7 to about 20 carbon atoms, $a$ is an integer from 1 to 3, $b$ is an integer from 0 to 2, $c$ is an integer from 1 to 3 and the sum of $a+b+c$ equals 4, comprising
    (a) reacting an alkenyl alkanoate with a halogenated silane having at least one halogen atom and at least one hydrogen atom, both of which are attached directly to the silicon atom;
    (b) further reacting the resultant product with a substance of the formula ROH where R is selected from the group consisting of hydrogen and hydrocarbyl or alkyl carbonyl having up to 8 carbon atoms, and removing byproducts from the reaction mixture; and
    (c) reacting the product of step (b) with a substance of the formula $$CH_2=\overset{R'}{\underset{|}{C}}COOR'''$$

where R' is selected from the group consisting of hydrogen and alkyl having up to 2 carbon atoms and R''' is selected from hydrogen or hydrocarbyl having up to 6 carbon atoms.

2. A process according to claim 1 wherein the monomeric silylalkyl acrylate product is extracted from the reaction product mixture by solvent extraction.

3. A process according to claim 1 wherein the alkenyl group of the alkenyl alkanoate has from 7 to about 20 carbon atoms.

4. A process according to claim 1 wherein the alkenyl group of the alkenyl alkanoate is a straight chained, terminally unsaturated group having from about 11 to about 18 carbon atoms.

5. A process according to claim 1 wherein the halogenated silane is a trihalosilane of the formula $$X_3—SiH$$

where X is selected from the group consisting of chlorine and bromine atoms.

6. A process according to claim 1 wherein the ROH reactant is an alkanol having up to 2 carbon atoms.

7. A process according to claim 1 wherein the compound $$CH_2=\overset{R'}{\underset{\diagdown}{C}}\overset{O}{\underset{\|}{C}}—OR'''$$

is methacrylic acid.

8. A process according to claim 1 wherein the first stage of the reaction is conducted in the presence of a platinum-containing or palladium-containing catalysts.

9. A process according to claim 8 wherein said catalyst is chloroplatinic acid.

10. A process for preparing trialkoxysilylalkyl methacrylates comprising
    (a) reacting an alkenyl alkanoate having a straight-chained, terminally unsaturated alkenyl group of from about 11 to about 18 carbon atoms with a trihalosilane in the presence of a platinum metals catalyst and removing unreacted silane by distillation at reduced pressure;
    (b) reacting the resultant product with an alkanol having up to two carbon atoms and removing byproducts by distillation at reduced pressure;
    (c) reacting the product of step (b) with methacrylic acid, and
    (d) separating the monomeric trialkoxysilylalkyl methacrylate from the reaction residue by a solvent extraction.

References Cited

UNITED STATES PATENTS

| 3,227,675 | 1/1966 | Papalos | 260—41 XR |
| 3,317,369 | 5/1967 | Clark et al. | 161—193 XR |

OTHER REFERENCES

Eaborn, "Organosilicon Compounds" Academic Press, New York, 1960, pp. 179–180, 228–229.

TOBIAS E. LEVOW, *Primary Examiner.*

J. P. PODGORSKI, *Assistant Examiner.*

U.S. Cl. X.R.

117—124; 260—41

UNITED STATES PATENT OFFICE

CERTIFICATE OF CORRECTION

Patent No. 3,427,337                                                             February 11, 1969

Robert E. Miller et al.

It is certified that error appears in the above identified patent and that said Letters Patent are hereby corrected as shown below:

Column 1, line 25, "Also described in a process" should read -- Also described is a process --. Column 2, line 35, "is unbranched radical" shoul read -- is an unbranched radical --. Column 4, line 4, "alknoate" should read -- alkanoate --; line 16, "methyldichlrosilane" should read -- methyldichlorosilane --. Column 6, lines 25 to 28, "Composition A is an unfille unreinforced polymethyl methacrylate composition identical to the compositic of Example 2 except that no silane is used and the inorganic loading is 65%" should read -- Composition A is an unfilled, unreinforced polymethyl methacrylate composition. Composition B is a filled polymethyl methacrylat composition identical to the composition of Example 2 except that no silane is used and the inorganic loading is 65% --

(SEAL)                  Signed and sealed this 7th day of April 1970.

Attest:

Edward M. Fletcher, Jr.                       WILLIAM E. SCHUYLER, JR

Attesting Officer                                           Commissioner of Patents